US010302893B2

(12) United States Patent
Jin et al.

(10) Patent No.: US 10,302,893 B2
(45) Date of Patent: May 28, 2019

(54) OPTICAL COMPONENT MOUNT DEVICE AND POST SYSTEM AND METHOD OF USE

(71) Applicant: Newport Corporation, Irvine, CA (US)

(72) Inventors: Wen Xu Jin, Laguna Hills, CA (US); James Fisher, Tustin, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 15/429,584

(22) Filed: Feb. 10, 2017

(65) Prior Publication Data
US 2017/0235086 A1    Aug. 17, 2017

Related U.S. Application Data

(60) Provisional application No. 62/327,362, filed on Apr. 25, 2016, provisional application No. 62/294,832, filed on Feb. 12, 2016.

(51) Int. Cl.
*F16M 13/00* (2006.01)
*G02B 7/00* (2006.01)

(52) U.S. Cl.
CPC .................................. *G02B 7/004* (2013.01)

(58) Field of Classification Search
CPC . F41G 11/003; F41G 1/38; F41G 1/35; F41G 3/06; F41G 1/473; F41G 11/001; F41G 1/345; F41G 3/08; F41G 11/004; F41G 1/01; F41G 1/30; F41G 1/00; F41G 1/02; F41G 3/165; F41G 11/002; F41G 1/54; F41G 1/08; F41G 1/387; F41G 1/32; F41G 1/16; F41G 1/467; F41G 1/033; F41G 1/34; F41G 11/007; F41G 1/10; F41G 1/44; F41G 3/02; F41G 1/18; F41G 1/26; F41G 1/42; F41G 3/12; F41G 1/36; F41G 1/40; F41G 1/12; F41G 1/17; F41G 1/545; F41G 3/005
USPC ...................... 248/187.1, 217.4, 507; 211/64
See application file for complete search history.

(56) References Cited

U.S. PATENT DOCUMENTS

| 6,014,269 A    * | 1/2000 | Nomura .................. G02B 7/102 359/700 |
| 6,204,977 B1 * | 3/2001 | Iwasa ..................... G02B 7/102 359/700 |
| 6,773,170 B1 | 8/2004 | Georgiev |
| 7,679,845 B2 | 3/2010 | Wang |
| 9,773,400 B1 * | 9/2017 | Kim .......................... B65G 1/02 |
| 2006/0022189 A1 * | 2/2006 | Collins, IV .......... E04H 12/2261 256/65.14 |
| 2006/0081745 A1 | 4/2006 | Theriault |

(Continued)

FOREIGN PATENT DOCUMENTS

WO    WO2014079731 A1    5/2014

*Primary Examiner* — Steven M Marsh
(74) *Attorney, Agent, or Firm* — Brian F. Swienton; Edward Scott Trask

(57) ABSTRACT

The present application discloses an optical post system for use with an optical mount device and includes at least one post body having at least one engaging surface formed thereon, at least one fastener recess configured to receive at least one fastener configured to couple the optical post system to at least one work surface therein formed in the post body, at least one fastener adjustment relief having at least one angled fastener plate positioned therein formed in the post body wherein the fastener adjustment relief is in communication with the fastener via the fastener recess.

12 Claims, 9 Drawing Sheets

(56) References Cited

U.S. PATENT DOCUMENTS

2009/0207410 A1    8/2009  Liu
2014/0096462 A1\*  4/2014  Haddock ............. E04F 13/0821
                                                    52/173.3
2015/0092105 A1\*  4/2015  Brinks ................... G03B 17/12
                                                    348/374

\* cited by examiner

OPTICAL COMPONENT MOUNT DEVICE AND POST SYSTEM AND METHOD OF USE

CROSS-REFERENCE TO RELATED APPLICATIONS

The present application claims priority to U.S. Provisional Patent Appl. Ser. No. 62/294,832, filed on Feb. 12, 2016, entitled "Optical Component Mount Device and Post System and Method of Use," and U.S. Provisional Patent Appl. Ser. No. 62/327,362, filed on Apr. 25, 2016, entitled "Optical Component Mount Device and Post System and Method of Use," the contents of which are incorporated by reference in their entirety herein.

BACKGROUND

Optical mount devices and system are presently used to support optical components within a vast array of optical systems. Typically, the user couples the optical mount supporting one or more optical elements to an optical post and positions the optical mount and post assembly at a desired location within the optical system.

While prior art optical mount and post assemblies have proven useful in the past, a number of shortcomings have been identified. For example, often positioning the optical component supported by the optical mount in a very precise location has proven difficult and time-consuming. Further, tilting or moving the optical component along a non-normal path has proven challenging without requiring expensive and complex mount systems. In addition, modern optical subsystems are being incorporated into smaller devices and systems. Unfortunately, prior art optical component mounts and post system typically requires a considerably larger envelope to maintain adjustable positioning within a subsystem. For example, optical posts typically include a flange which is configured to be received within a post clamp or fork member coupled to the optical table or work surface. The user positions the flange under the clamp or fork member and tightens the fasteners coupling the clamp or fork member to the work surface, thereby securing the optical post to the work surface. As such, system designers may forego the use of adjustable optical component mounts and post systems based solely on consideration of space rather than performance capabilities.

Thus, in light of the foregoing, there is an ongoing need for an optical component mount device and post system permitting a user to quickly and precisely position an optical component within an optical system.

SUMMARY

The present application is directed various embodiments of an optical mount device used to support one or more optical components within an optical system. More specifically, the optical mount device disclosed herein permits the user to easily and selectively adjust the position and tilt of at least one optical component supports by the optical mount device. In one embodiment, the present application is direct to an optical mount device and discloses at least one mount body defining at least one optical component receiver sized to receive at least one optical component therein. At least one plate member is in communication with and extends from the mount body. The plate member includes at least one tilt adjust passage and at least one position lock device receiver formed therein. At least one base member is in communication with the plate member. The base member is separated from the plate member by at least one positioning relief. At least one tilt adjust device may be positioned within the tilt adjust passage. The tilt adjust device is configured to selectively traverse the plate member and selectively engage the base member. During use, the tilt adjust device is configured to apply at least one tilting force to the plate member relative to the base member, which results in the user to selectively tilt the position of the plate member, and the optical component coupled thereto, relative to the base member.

The present application also discloses various embodiments an optical post system for use with an optical mount device. In one embodiment, the optical post system includes at least one post body having at least one engaging surface formed thereon. The engaging surface may be configured to have at least one optical component mount thereto. At least one fastener recess may be formed in the post body. During use, the fastener recess is configured to receive at least one fastener configured to couple the optical post system to at least one work surface therein. In addition, the optical post system includes at least one fastener adjustment relief formed in the post body wherein the fastener adjustment relief is in communication with the fastener via the fastener recess. The fastener adjustment relief includes at least one angled fastener plate positioned therein the fastener adjustment relief.

Further, the present application is directed to a method of coupling an optical post system to a work surface. In one embodiment, the method discloses coupling a threaded fastener to a threaded mounting hole formed in a work surface. Thereafter, an optical post system having a post body defining at least one fastener recess configured to receive a portion of the threaded fastener therein may be positioned proximate to the threaded fastener such that the threaded fastener lies within the fastener recess. The user may insert at least one coupling tool into at least one fastener adjustment relief formed on the post body and actuate the fastener positioned within the fastener recess of the post body via the fastener adjustment relief.

Other features and advantages of the optical mount device and post system for use with as described herein will become more apparent from a consideration of the following detailed description.

BRIEF DESCRIPTION OF THE DRAWINGS

Various embodiments of the optical mount device and post system will be explained in more detail by way of the accompanying drawings, wherein.

DETAILED DESCRIPTION

Figure 1:
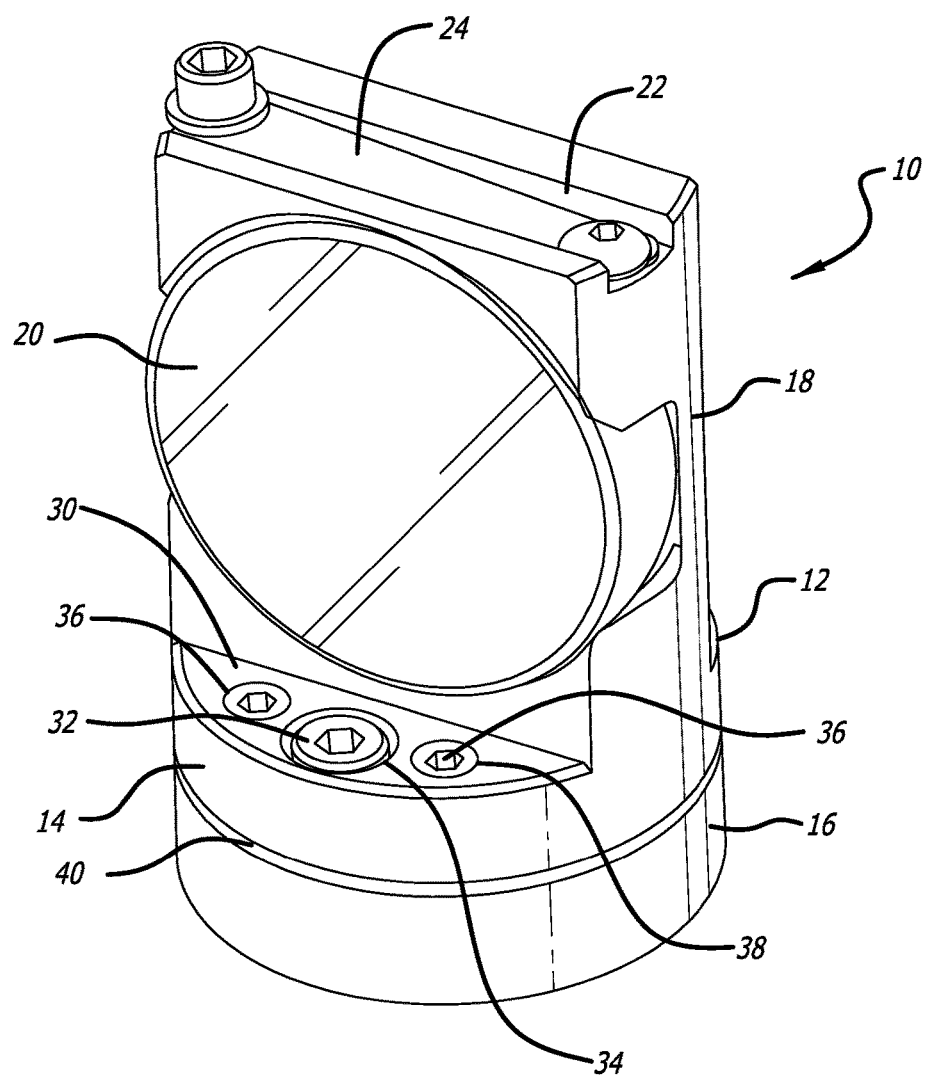
FIG. 1 shows an elevated perspective view of an embodiment of an optical mount device having an optical component coupled thereto.
Figure 2:
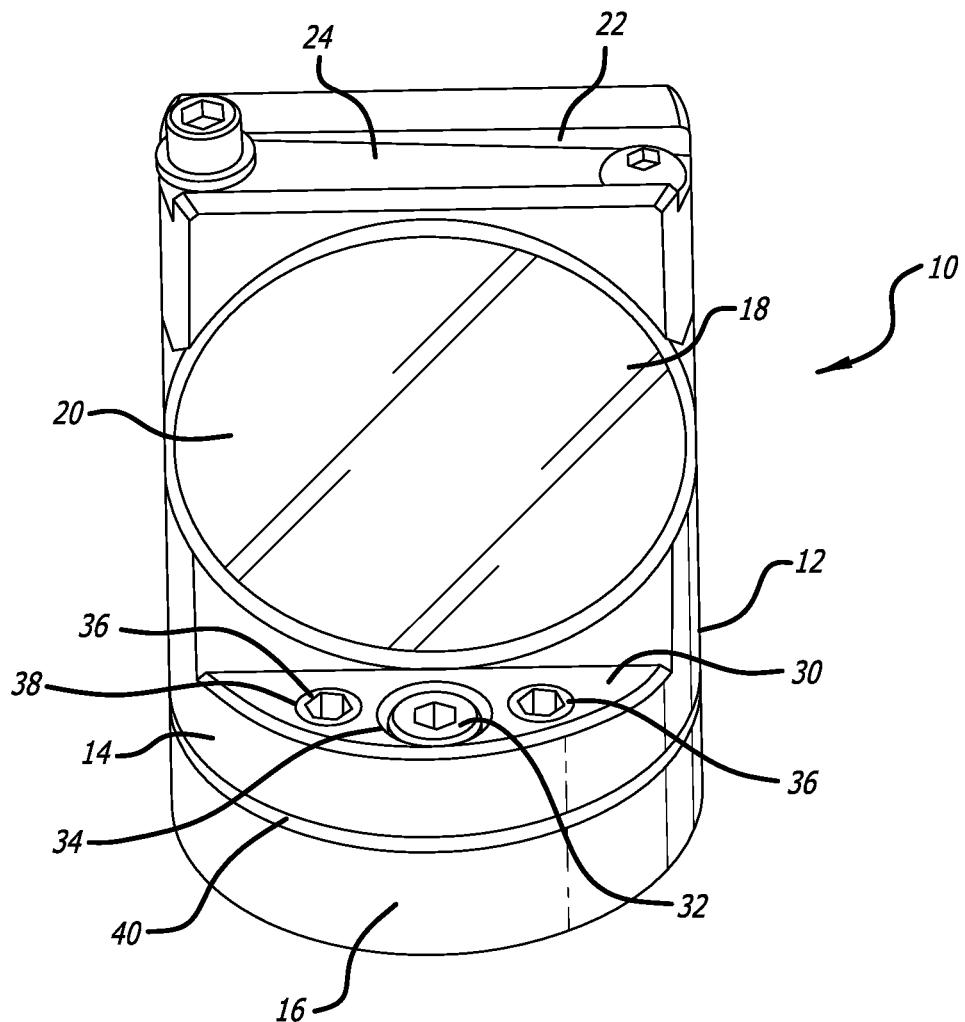
FIG. 2 shows an elevated perspective view of an embodiment of an optical mount device having at least one tilt adjustment device and at least one position lock device thereon.

The present application is directed to various embodiments of an optical component mount device and post system and method of use. As shown in FIGS. 1 and 2, in one embodiment the optical component mount device 10 includes at least one mount body 12 having one or more plate members 14 formed thereon or integral thereto. In one embodiment, the mount body 12 and plate member 14 form a monolithic body. In another embodiment, the mount body 12 and plate member 14 are formed from separate members.

Referring again to FIGS. 1 and 2, at least one base member 16 may be positioned proximate to the plate member 14. In the illustrated embodiment, the plate member 14 and base member 16 may form a monolithic body. In the alternative, the plate member 14 and base member 16 may be formed from separate members. The plate member 14 and base member 16 may be separated by at least one positioning relief 40.

Figure 4:
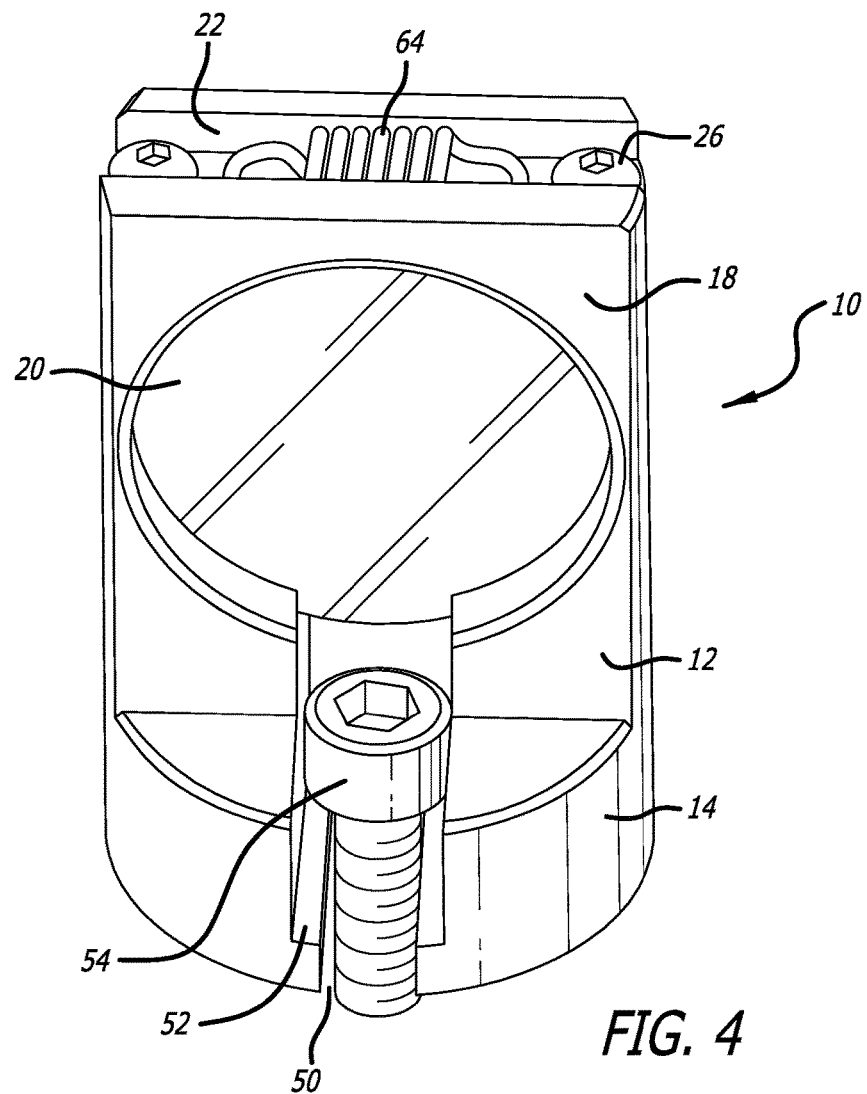
FIG. 4 shows an elevated perspective view of an embodiment of an optical mount device having an optical component coupling device positioned within a coupling recess formed on the mount body.

As shown in FIGS. 1 and 2, the mount body 12 further includes at least one optical component receiver 18 configured to receive and support at least one optical component 20 therein. Exemplary optical components include, without limitations, lenses, mirrors, wave plates, flats, filters, gratings, beam splitters, detectors, sensors, lasers, and the like. In the illustrated embodiment, the component receiver 18 is configured to support and position at least one round optical component therein, although those skilled in the art will appreciate that the component receiver 18 may be configured to support any variety of optical components of any variety of shapes therein. Optionally, the component receiver 18 of the optical mount 10 may be configured to support at least one optical component using at least one adapter or fixture (not shown). In addition, optical mount 20 shown in the illustrated embodiment includes at least one component coupling recess 22 positioned proximate to the component receiver 18. The component coupler recess 22 may include at least one component coupler or retaining device 24 therein. In the illustrated embodiment, at least one fastener 26 may be used to couple the component coupler device 24 to the mount body 12. During use, the component coupler device 24 may be configured to engage or apply at least one component retaining force to at least one optical component 20 positioned within the component receiver 18 of the mount body 12. For example, at least one biasing member 64 or similar device may be used to apply a retaining force to an optical component 20 positioned within the component receiver 18 (See FIG. 4). Exemplary biasing members include, without limitations, springs, leaf members, silicon pads, screws, pins, polymer pads, frictions members, adhesive devices, and the like.

As shown in FIGS. 1-4, at least one plate member surface 30 may be formed on or coupled to the plate member 14. In the illustrated embodiment, the plate member surface 30 includes at least one of a tilt adjust passage or recess 34 and a position lock device receiver 38. For example, in the illustrated embodiment, the plate member surface 30 includes one tilt adjust passage 34 and two position lock device receivers 38. Optionally, any number of tilt adjust passages 34 and position lock device receivers 38 may be positioned upon of formed within the plate member 14.

Figure 5:
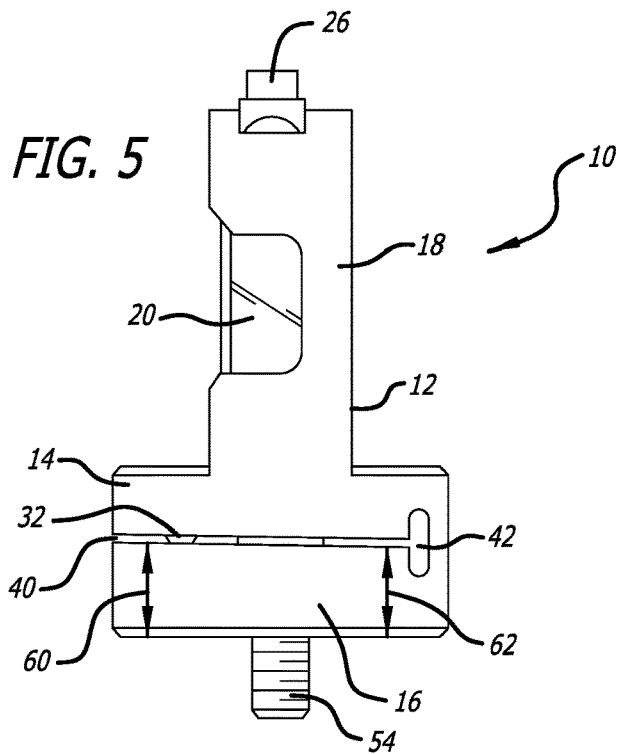
FIG. 5 shows a side, planar view of an optical mount device wherein the plate member is separated from the base member by a positioning relief.
Figure 7:
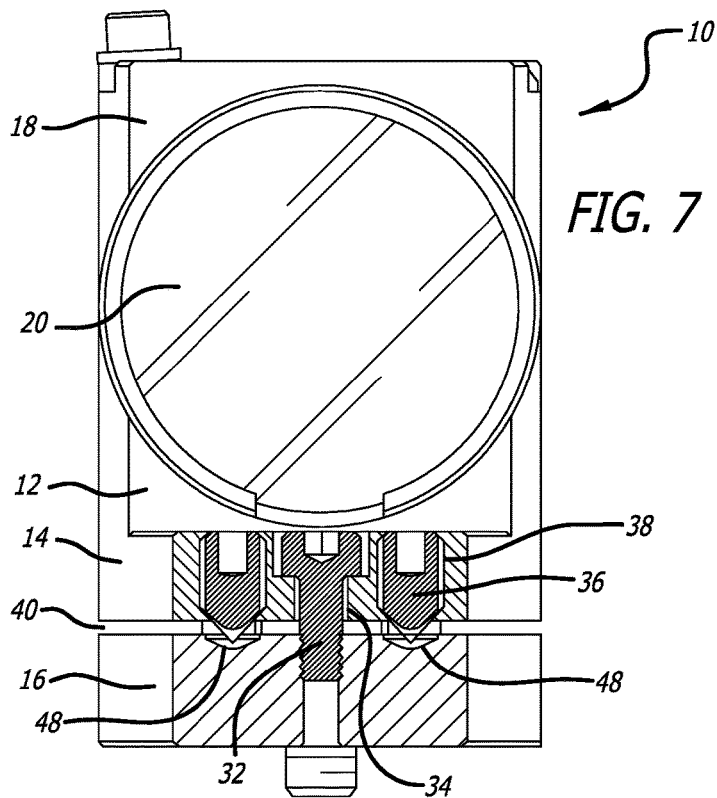
FIG. 7 shows a planar cross sectional view of an embodiment of an optical mount device having an optical component coupled thereto, the optical mount device having a tilt adjustment device traversing through the plate member to the base member.
Figure 8:
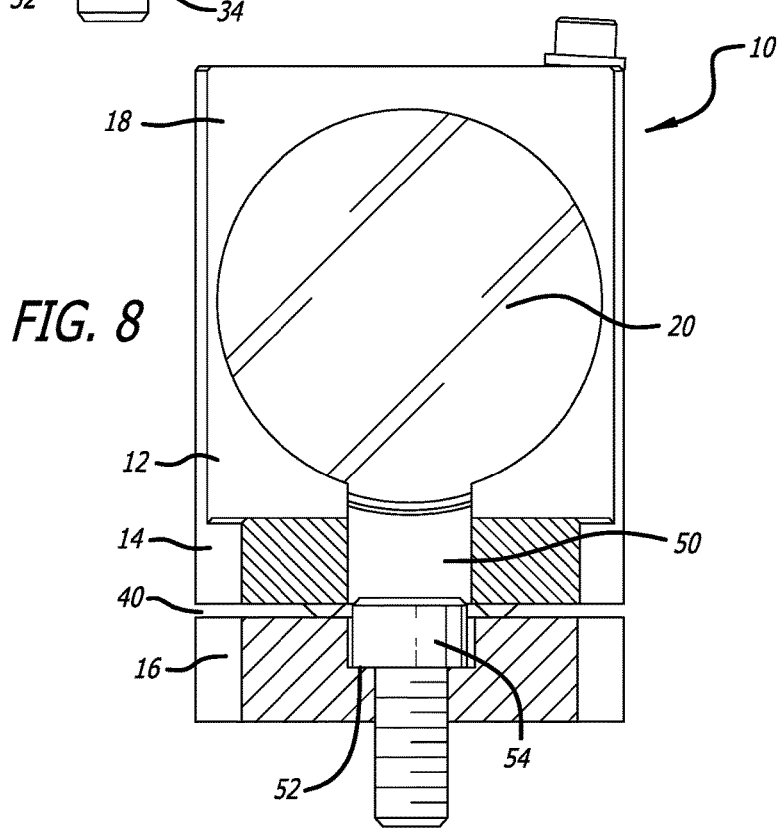
FIG. 8 shows a planar cross sectional view of an embodiment of an optical mount device having an optical component coupled thereto, the optical mount device having a coupling device traversing through the base member.
Figure 9:
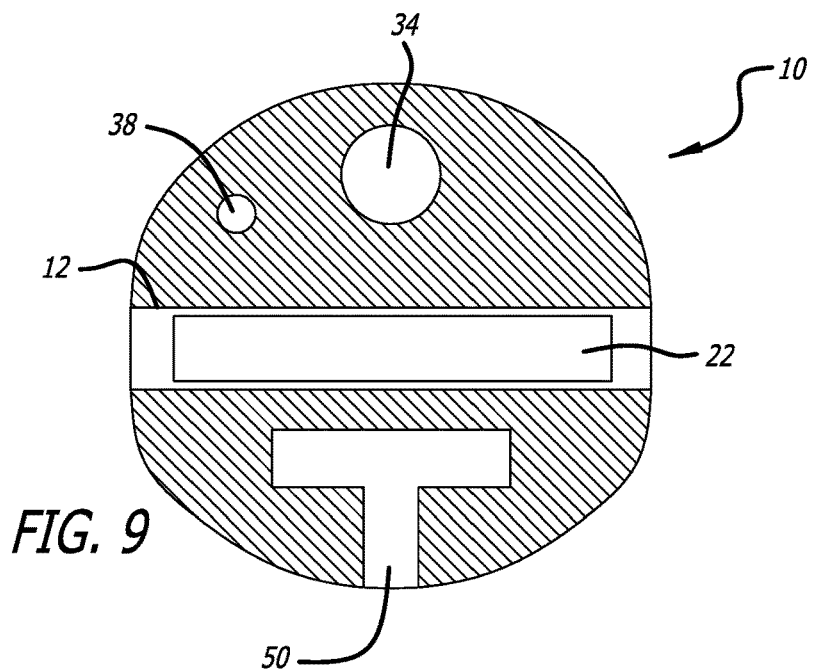
FIG. 9 shows a top cross sectional view of an embodiment of a base member of an embodiment of an optical mount device.

As shown, at least one tilt adjust member 32 may be positioned within the tilt adjust passage 34 formed in the plate member 14. As shown in FIGS. 1, 5, and 7, at least a portion of the tilt adjust member 32 traverses through the plate member 14 and the positioning relief 40 and engages at least a portion of the base member 16. For example, at least a portion of the tilt adjust passage 34 may include one or more threaded areas configured to engage and retain at least one tilt adjust member 32 having a threaded body wherein the tilt adjust member 32 may be capable of adjustably traversing through the plate member 14 and the positioning relief 40 separating the plate member 14 from the base member 16. Optionally, the tilt adjust member 32 may include any variety of engaging devices or features formed thereon configured to permit the tilt adjust member 32 to movable engage and be retained by the tilt adjust passage 34 formed in the plate member 14.

Referring again to FIGS. 1, 2, 6, 7, and 9, at least one position lock device 36 may be positioned within at least one position lock device receiver 38 formed on the plate member 14. As shown in FIGS. 1, 5, and 7, at least one position lock device 36 may be configured to traverse the position lock device receiver 38 and the positioning relief 40, to engage and/or be retained within at least one position lock device member or port 48 formed in the base member 16. In one embodiment, the position lock device member 48 comprises a silicon carbide pad. In another embodiment, the position lock device member 48 comprises a titanium pad. Optionally, the position lock device member 48 may comprise a planar body, conical seating body, concave body, threaded body, and the like. In one embodiment, at least one of the position lock device 36, position lock device receiver 38, and the position lock device member 48 includes at least one thread member (not shown) thereon, the thread members configured to permit the position lock device 36 to securely engage and be retained within at least one of the position lock device receiver 38 and the position lock device member 48. During use, the user may selectively actuate at least one of the tilt adjust member 32 and the position lock device 36 such that the position of the plate member 14 is securely retained in a desired position within reference to the base member 16. For example, at least one of the tilt adjust member 32 and the position lock device 36 may be actuated such that the plate member 14 is positioned substantially parallel to the base member 16. In another embodiment, at least one of the tilt adjust member 32 and the position lock device 36 may be actuated such that the plate member 14 is positioned substantially non-parallel to the base member 16.

As shown in FIGS. 1-3 and 5, at least one positioning relief 40 may be formed between the plate member 14 and the base member 16. As shown, in one embodiment the positioning relief 40 may include at least one positioning feature 42 positioned proximate to at least one wall member 44. As such, in the illustrated embodiment, the plate member 14 and base member 16 are non-detachably coupled. During use, the tilt adjust device 32 may be actuated such that a portion of the tilt adjust device 32 engages at least one of the position lock device member 48 and/or the base member 16 which results in the at least a portion of the plate member 14 moving away from the base member 16, thereby selectively increased or decreased by actuating the tilt adjust device 42 and resulting in a change of a transverse dimension of the positioning relief 40. Optionally, as shown in FIG. 5, the height and/or thickness of at least one or the plate member 14 and/or the base member 16 need not be constant. For example, FIG. 5 shows an embodiment of an optical mount 10 having a base member 16 having a thicker portion 60 and a thinner portion 62, thereby permitting the user to precisely adjust the tilt of the optical mount 10 relative to an incident optical signal. In the alternative, the thickness of the plate member 14 and/or base member 16 may be constant.

Figure 3:
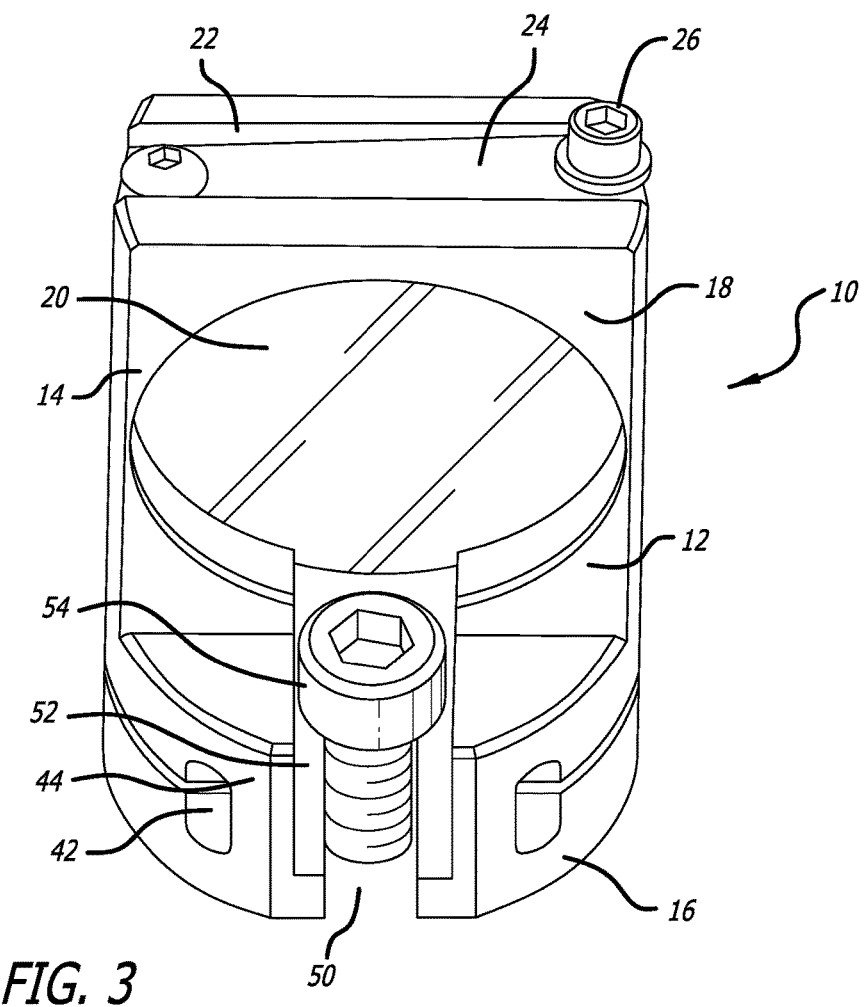
FIG. 3 shows an elevated perspective view of an embodiment of an optical mount device having at least one coupling channel formed thereon, the coupling channel receiving a coupling device or fastener therein.
Figure 6:
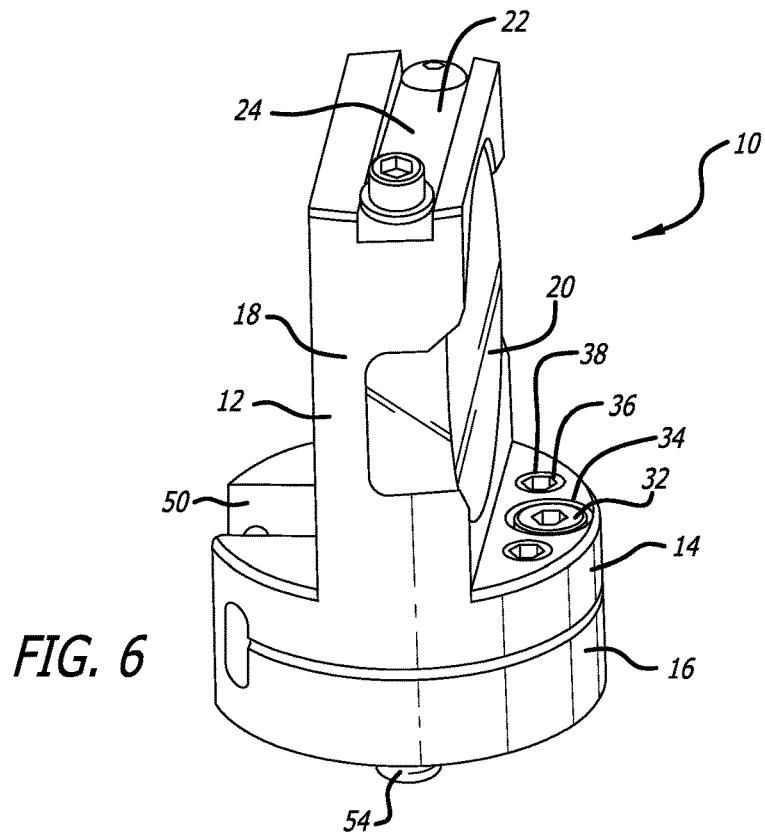
FIG. 6 shows an elevated perspective view of an embodiment of an optical mount device having at least one coupling channel formed thereon, the coupling channel receiving a coupling device or fastener therein.

As shown in FIGS. 3, 5, 6, 8 and 9, in one embodiment the optical mount 10 may include at least one coupling channel 50 of similar feature permitting the optical mount 10 to be selectively coupled to or movably coupled to at least one fixture, optical post, structure and/or similar component. For example, in the illustrated embodiment, the optical mount 10 includes a single coupling channel 50 formed in at least a portion of the plate member 14, the base member 16, or both. As shown, the coupling channel 50 may include at least one fastener interface or flange 52 formed within the coupler channel 50. Further, as shown, in one embodiment the coupler channel 50 traverse through the base member 16, thereby permitting at least one fastener 54 positioned within the coupler channel 50 to selectively engage and be retained by at least one optical post, structure, fixture, or similar component (hereinafter optical post). For example, during use the user may position at least one fastener 54 within the coupler channel 50 and actuate the fastener 54 such that the fastener engages the fastener flange 52, traverses through the plate member 14 and base member 16, and engages at least a portion of the optical post, thereby securely coupling the optical mount to the optical post. As shown in FIGS. 3 and 6, the coupling channel 50 may comprise an elongated linear channel shape thereby permitting the user to easily adjust the position of the optical mount 10 along a single axis. In contrast, the coupling channel 50 may be shaped and configured to permit the user to easily adjust the position of the optical mount 10 along multiple axes. As such, the user may be capable quickly and easily adjust the position of the optical mount 10 when coupled to an optical post.

Figure 10:
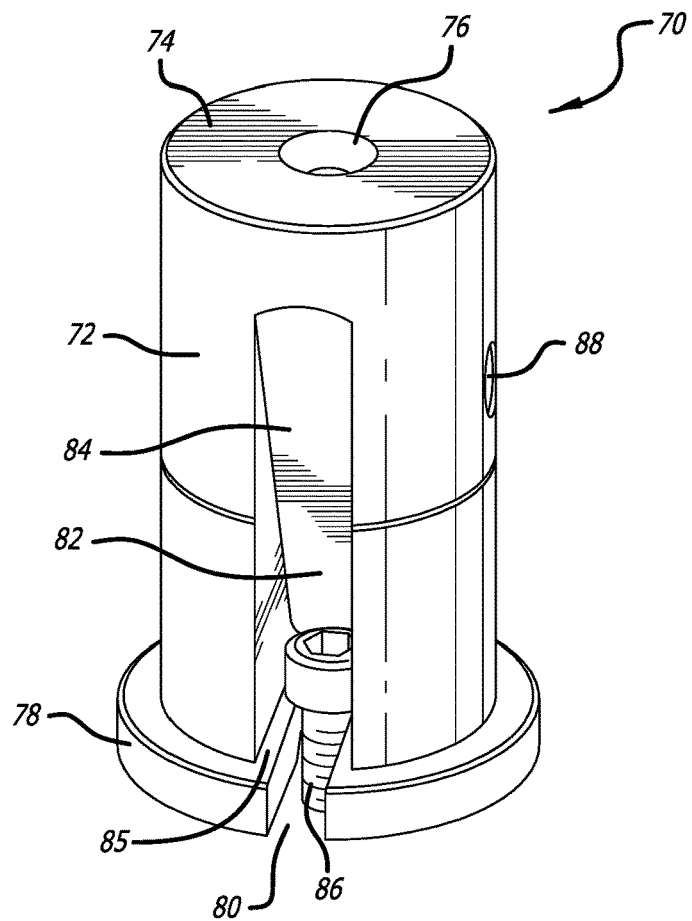
FIG. 10 shows an elevated perspective view of an embodiment of an optical post system for use in positioning an optical mount device at a desired location.
Figure 11:
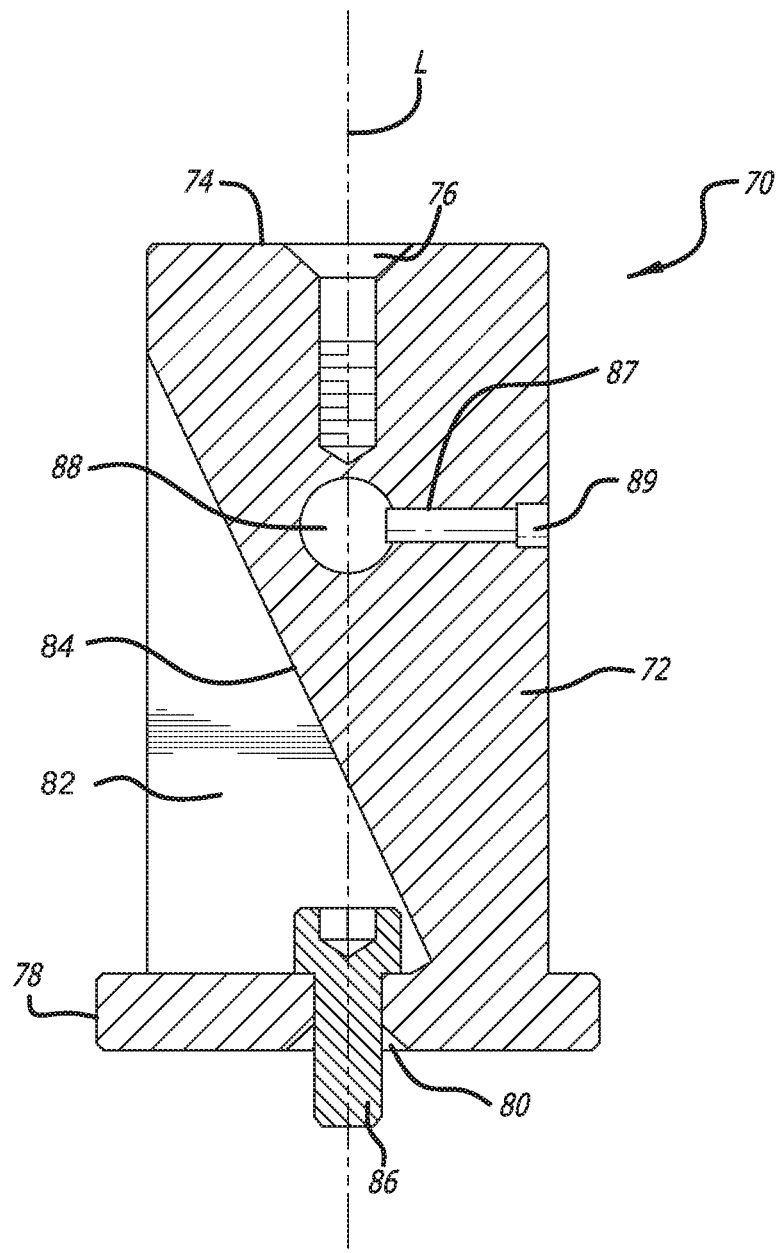
FIG. 11 shows a planar cross sectional view of an embodiment of an optical post system having an angled adjustment plate positioned within a fastener adjustment relief formed in the post body.

FIGS. 10 and 11 show various views of an embodiment of an optical post system for use with the optical mount 10 described in FIGS. 1-9 or any other optical mount or component mount. More specifically, the post system 70 includes a post body 72 having at least one engaging surface 74 formed thereon. In the illustrated embodiment, the engaging surface 74 comprises a planar surface, although those skilled in the art will appreciate that the engaging surface 74 may be formed in any variety of shapes or configurations. At least one retaining port 76 may be formed on the engaging surface 74. In the illustrated embodiment, the retaining port 76 is positioned along and collinear with the longitudinal axis L of the post body 72. Optionally, the retaining port 76 need not be positioned along the longitudinal axis L of the post body 72. In the illustrated embodiment, the retaining port 76 may comprise a threaded port sized to receive and retain at least one fastener therein. Optionally, the engaging surface may include any variety of devices or systems configured to receive and retain at least one optical mount thereon, including, without limitations, magnetic devices, coupling features, adhesive devices, and the like. As such, the engaging surface 74 need not include a retaining port 76 thereon. Optionally, the optical mount 70 may be configured to engage the couple at least one optical component mount or other component mount (not shown) to any portion of the post body 72. For example, one or more additional retaining ports 88 may be formed at various locations of the post body 72. For example, in one embodiment, the retaining passage 88 may be sized to receive at least one optical rail or similar device therein. In the illustrated embodiment, the retaining passage 88 includes at least one passage lock device 89 positioned within at least one passage lock recess 87 formed in the post body 72. The passage lock device 89 positioned within at least one passage lock recess 87 may be configured to apply at least one clamping force or similar retaining force to securely couple the optical rail or similar device (not shown) positioned within the retaining passage 88 to the post body 72. Optionally, the post body 72 may be manufactured without at least one of the passage lock recess 87, retaining passage 88, and/or passage lock device 89.

Referring again to FIGS. 10 and 11, the post body 72 may include one or more attachment flanges 78 positioned thereon or coupled thereto. In one embodiment, the attachment flange 78 enables the post system 70 to be detachably coupled to an optical table using attachment forks or similar devices known in the art. In the alternative, the inclusion of the adjustment relief 82 eliminates the need for the use of attachment forks (not shown) and the attachment flange 78. As such, the optical post system 70 may be manufactured without an attachment flange 78, thereby decreasing the footprint of the post system 70. The post body 72 may include one or more fastener recess 80 sized to receive one or more fasteners 86 therein. In the illustrated embodiment, the fastener recess 80 includes at least one fastener flange 85 formed therein. The fastener 86 may be configured to engage the fastener flange 85 and selectively couple the post system 70 to an optical table or work surface.

As shown in FIGS. 10 and 11, at least one fastener adjustment relief 82 is formed in the post body 72. In one embodiment, the fastener adjustment relief 82 includes a generally angled relief plate 84. For example, as shown in FIG. 11, in one embodiment, the angled fastener relief plate 84 intersects the longitudinal axis L of the post body 72. In the illustrated embodiment, the fastener 86 positioned within the fastener adjustment relief 82 is positioned along and collinear with the longitudinal axis L of the post body 72. During use, the fastener adjustment relief 82 permits the user to access, with a tool, at least a portion of a fastener 86 positioned within the fastener recess 80 to easily couple, decouple, and/or adjust the position of the post system 70 when coupled to an optical table or similar work surface. Optionally, the angled fastener relief plate 84 need not intersect the longitudinal axis L of the post body 72. Optionally, the fastener relief plate 86 need not be angled. As such, the fastener 86 positioned within the fastener adjustment relief 82 need not be positioned along and collinear with the longitudinal axis L of the post body 72.

Figure 12:
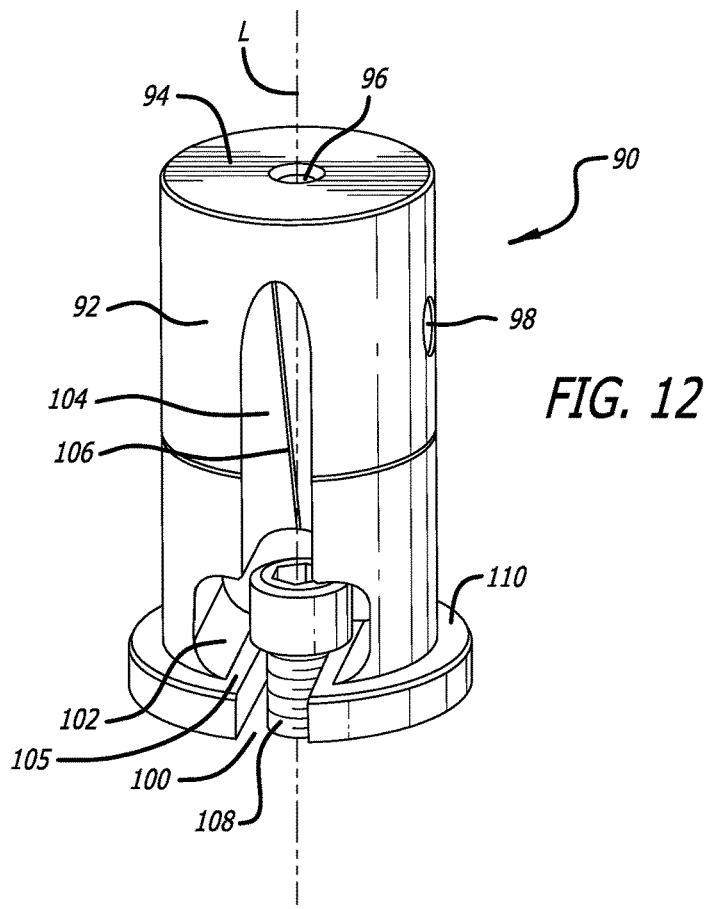
FIG. 12 shows an elevated perspective view of another embodiment of an optical post system for use in positioning an optical mount device at a desired location.
Figure 13:
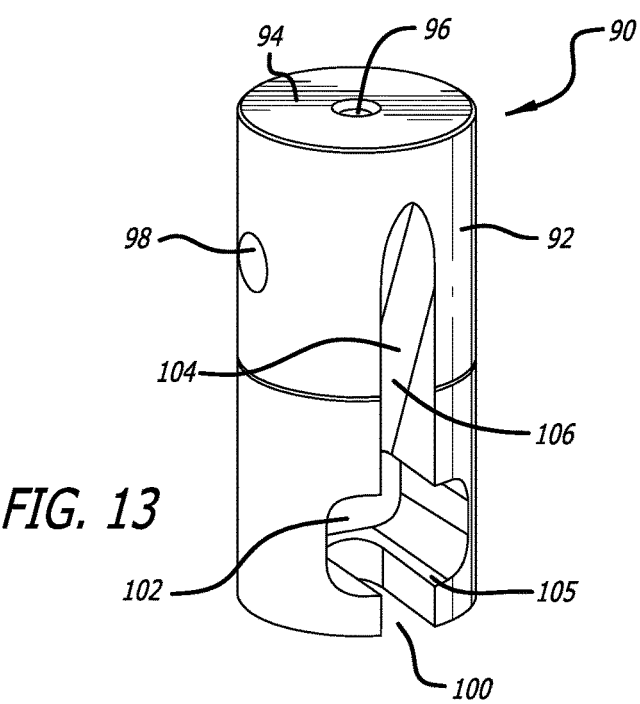
FIG. 13 shows an elevated perspective view of another embodiment of an optical post system for use in positioning an optical mount device at a desired location.

FIGS. 12 and 13 show various alternate embodiments of the optical post system shown in FIGS. 10 and 11. As shown in FIGS. 12 and 13, the optical post system 90 may include at least one post body 92 having at least one engaging surface 94 formed thereon. In the illustrated embodiment, the engaging surface comprises a substantially planar surface configured to have one or more optical component holders, mounts, and retaining devices coupled thereto. Optionally, the engaging surface 94 may include any variety of shapes and/or features configured to permit one or more optical component holders, mounts, and the like to be coupled thereto. At least one retaining port 96 may be formed on the engaging surface 94. In one embodiment, the retaining port 96 comprises a threaded port sized to receive and retain at least one fastener therein. Like the previous embodiment, the retaining port 96 may be positioned along the longitudinal axis L of the post body 92. Optionally, the engaging surface may include any variety of devices or systems configured to receive and retain at least one optical mount thereon, including, without limitations, magnetic devices, adhesive devices, and the like. As such, the engaging surface need not include a retaining port 96 thereon. Optionally, the optical mount may be configured to engage the couple to any portion of the post body 92. For example, one or more additional retaining ports 98 may be formed at various locations of the post body 92.

As shown in FIG. 12, the post body 92 may include one or more attachment flanges 98 positioned thereon or coupled thereto. In one embodiment, the attachment flange 98 enables the post system 90 to be detachably coupled to an optical table using attachment forks or similar devices known in the art, although the inclusion of the adjustment relief 104 eliminates the need for the attachment flange 98. As such, the optical post system 90 may be manufactured without an attachment flange 98, thereby decreasing the footprint of the post system 90. For example, FIG. 13 shows an embodiment of the optical post system 90 manufactured without an attachment flange 98 formed on the post body 92. The post body 92 may include one or more fastener recesses 100 sized to receive one or more fasteners 108 therein. The fastener 108 may be configured to engage at least one fastener flange 105 formed in the fastener recess 100 and selectively couple the post system 90 to an optical table or work surface. In one embodiment, the fastener 108 is positioned along and collinear with the longitudinal axis L of the post body 92.

As shown in FIGS. 12 and 13, at least one fastener adjustment relief 104 is formed in the post body 92. In the illustrated embodiment, the fastener adjustment relief 104 includes at least one fastener positioning relief 102 formed on the post body 92 proximate to the fastener recess 100. The fastener positioning relief 102 permits the user to selectively adjust the location of the optical post system 90 along two axes relative to the fastener 108. In one embodiment, the fastener adjustment relief 104 includes an angled relief plate 106. In the illustrated embodiment, the angled relief plate 106 intersects the longitudinal axis L of the post body 92, although those skilled in the art will appreciate that the angled relief plate 106 need not intersect the longitudinal axis L of the post body 92. Optionally, the relief plate 106 need not be angled. During use, the angled relief plate 106 permits the user to access, with a tool, at least a portion of a fastener 108 positioned within the fastener recess 104 to easily couple, decouple, and/or adjust the position of the post system 90 when coupled to an optical table or similar work surface.

The present application also discloses a method of coupling the optical post system described herein to a work surface. With reference to FIGS. 12 and 13, during use, the user may insert at least one threaded fastener 108 into a threaded mounting hole formed in an optical table of work surface (not shown). Thereafter, the user may position the post system 90 proximate to the fastener 108 coupled to the optical table such that the fastener 108 is positioned within the fastener positioning recess 102 formed on the post body 92. The user may then adjust the location of the post system 90 to a desired location. For example, the user may adjust the position of the optical post along an X axis, a Y axis, or both axes. Thereafter, the user may insert a coupling tool into the adjustment relief 104 to access and actuate the fastener 108 such that the fastener 108 engages and applied a clamping force to the fastener flange 105 formed in the fastener recess, thereby coupling the post system 90 to the work surface.

The embodiments disclosed herein are illustrative of the principles of the invention. Other modifications may be employed which are within the scope of the invention. Accordingly, the devices disclosed in the present application are not limited to that precisely as shown and described herein.

What is claimed:

1. An optical post system comprising:
at least one post body having at least one diameter and at least one engaging surface formed thereon, the engaging surface configured to have at least one optical component mount thereto;
at least one fastener recess formed in the post body, the fastener recess extending into the diameter of the post body and configured to receive at least one fastener configured to couple the optical post system to at least one work surface therein;
at least one fastener adjustment relief formed in the post body, the fastener adjustment relief having at least one angled fastener relief plate positioned therein, the fastener adjustment relief in communication with the fastener via the fastener recess and configured to allow the fastener to be positioned within the diameter of the post body; and
wherein the fastener adjustment relief, the angled fastener relief plate and the post body form a monolithic structure.

2. The optical post system of claim 1 further comprising at least one retaining port formed on the engaging surface, the retaining port configured to receive one or more coupler therein.

3. The optical post system of claim 1 wherein the angled fastener plate positioned within the fastener adjustment relief intersects the longitudinal axis of the post body.

4. The optical post system of claim 1 wherein the angled fastener plate positioned within the fastener adjustment relief does not intersect the longitudinal axis of the post body.

5. The optical post system of claim 1 further comprising at least one fastener flange in communication with the post body, the fastener flange extending into the fastener adjustment relief, the fastener flange configured to engage the fastener positioned within the fastener adjustment relief.

6. A method of coupling an optical post system to a work surface, comprising:

coupling a threaded fastener to a threaded mounting hole formed in a work surface;

positioning an optical post system having a post body having at least one diameter defining at least one fastener recess extending into the diameter of the post body and configured to receive a portion of the threaded fastener therein such that the threaded fastener lies within the fastener recess, wherein the fastener recess is configured to allow the fastener to be positioned within the diameter of the post body;

inserting at least one coupling tool into at least one fastener adjustment relief formed on the post body; and actuating the fastener positioned within the fastener recess of the post body via the fastener adjustment relief.

7. The method of claim 6 further comprising adjusting the position of the optical post system along an X axis prior to actuating the fastener positioned within the fastener recess.

8. The method of claim 6 further comprising adjusting the position of the optical post system along an Y axis prior to actuating the fastener positioned within the fastener recess.

9. The method of claim 6 further comprising adjusting the position of the optical post system along both and an X axis and a Y axis prior to actuating the fastener positioned within the fastener recess.

10. An optical post system comprising:
at least one post body having at least one engaging surface formed thereon, the engaging surface configured to have at least one optical component mount thereto;
at least one fastener recess formed in the post body, the fastener recess configured to receive at least one fastener configured to couple the optical post system to at least one work surface therein;
at least one fastener adjustment relief formed in the post body, the fastener adjustment relief having at least one angled fastener relief plate positioned therein, the fastener adjustment relief in communication with the fastener via the fastener recess;
at least one retaining port formed on the engaging surface, the retaining port configured to receive one or more couplers therein;
at least one retaining passage formed in the post body orthogonal to a longitudinal axis of the post body, the retaining passage configured to receive at least one optical component therein; and
at least one passage lock device selectively positioned within at least one passage lock recess, the passage lock device in communication within the retaining passage.

11. An optical post system comprising:
at least one post body having at least one engaging surface formed thereon, the engaging surface configured to have at least one optical component mount thereto;
at least one fastener recess formed in the post body, the fastener recess configured to receive at least one fastener configured to couple the optical post system to at least one work surface therein;
at least one fastener adjustment relief formed in the post body, the fastener adjustment relief having at least one angled fastener relief plate positioned therein, the fastener adjustment relief in communication with the fastener via the fastener recess;
at least one retaining port formed on the engaging surface, the retaining port configured to receive one or more couplers therein;
at least one retaining passage formed in the post body orthogonal to a longitudinal axis of the post body, the retaining passage configured to receive at least one optical component therein; and
at least one passage lock device selectively positioned within at least one passage lock recess, the passage lock device in communication within the retaining passage, wherein the angled fastener plate positioned within the fastener adjustment relief intersects or does not intersect the longitudinal axis of the post body.

12. An optical post system comprising:
at least one post body having at least one engaging surface formed thereon, the engaging surface configured to have at least one optical component mount thereto;
at least one fastener recess formed in the post body, the fastener recess configured to receive at least one fastener configured to couple the optical post system to at least one work surface therein;
at least one fastener adjustment relief formed in the post body, the fastener adjustment relief having at least one angled fastener relief plate positioned therein, the fastener adjustment relief in communication with the fastener via the fastener recess;
at least one retaining port formed on the engaging surface, the retaining port configured to receive one or more couplers therein;
at least one retaining passage formed in the post body orthogonal to a longitudinal axis of the post body, the retaining passage configured to receive at least one optical component therein;
at least one passage lock device selectively positioned within at least one passage lock recess, the passage lock device in communication within the retaining passage, wherein the angled fastener plate positioned within the fastener adjustment relief intersects or does not intersect the longitudinal axis of the post body; and
at least one fastener flange in communication with the post body, the fastener flange extending into the fastener adjustment relief, the fastener flange configured to engage the fastener positioned within the fastener adjustment relief.

* * * * *